(12) United States Patent
Krog et al.

(10) Patent No.: US 9,109,653 B2
(45) Date of Patent: Aug. 18, 2015

(54) DAMPER

(75) Inventors: Andreas Krog, Winkelhaid (DE);
Roland Löscher, Tennenlohe (DE);
Andreas Strobel, Leinburg-Gersdorf (DE); Andreas Böhrer, Neumarkt (DE)

(73) Assignee: SUSPA GmbH, Altdorf (DE)

(*) Notice: Subject to any disclaimer, the term of this patent is extended or adjusted under 35 U.S.C. 154(b) by 278 days.

(21) Appl. No.: 13/111,219

(22) Filed: May 19, 2011

(65) Prior Publication Data

US 2011/0284333 A1 Nov. 24, 2011

(30) Foreign Application Priority Data

May 20, 2010 (DE) .................. 10 2010 029 180

(51) Int. Cl.
*F16F 9/06* (2006.01)
*F16F 9/19* (2006.01)
*F16F 9/46* (2006.01)

(52) U.S. Cl.
CPC ............ *F16F 9/468* (2013.01); *F16F 9/062* (2013.01)

(58) Field of Classification Search
CPC ....... F16F 9/462; F16F 9/3405; F16F 9/3485; F16F 9/3214; F16F 9/34; F16F 9/44; F16F 9/185; F16F 9/26; F16F 9/0218
USPC ........... 188/313, 67, 314, 315, 317, 312, 318, 188/282.9, 266.4, 299.1, 322.22; 91/404, 91/405, 406; 92/165 R; 137/538
See application file for complete search history.

(56) References Cited

U.S. PATENT DOCUMENTS

| 2,785,774 | A | * | 3/1957 | Long et al. ................... 188/274 |
| 2,803,313 | A | * | 8/1957 | Ulmann ..................... 188/282.9 |
| 4,800,994 | A | | 1/1989 | Imaizumi et al. |
| 4,800,995 | A | * | 1/1989 | Bernhardt et al. ......... 188/266.4 |
| 5,293,968 | A | | 3/1994 | Schuelke et al. |
| 5,293,971 | A | | 3/1994 | Kanari et al. |

(Continued)

FOREIGN PATENT DOCUMENTS

| DE | 3321680 A1 | 1/1984 |
| DE | 3434566 A1 | 4/1985 |

(Continued)

OTHER PUBLICATIONS

European Search Report of EP11165684.9 dated Feb. 6, 2015.

*Primary Examiner* — Anna Momper
*Assistant Examiner* — San Aung
(74) *Attorney, Agent, or Firm* — Browdy and Neimark, PLLC

(57) ABSTRACT

Damper including a housing enclosing a working chamber and a compensating chamber, a damping fluid located at least partially in the working chamber, a guide and sealing unit, which terminates the housing at a first housing end, a piston rod sealed by the guide and sealing unit, and guided out of the housing, and a piston fastened to the piston rod and guided in the housing along the center longitudinal axis of the damper. The piston divides the working chamber into first and second part working chambers. Arranged at the end of the first and second working chambers, respectively, is a first and second closing element, with respective compensating channels, which form a through-flow connection between the respective working chamber and the compensating chamber. The piston device has at least one through-flow channel connecting the two part working chambers and having an adjustable effective flow cross-section.

27 Claims, 9 Drawing Sheets

(56) References Cited

U.S. PATENT DOCUMENTS

| | | | |
|---|---|---|---|
| 5,324,066 A | 6/1994 | Masamura et al. | |
| 2006/0081431 A1* | 4/2006 | Breese | 188/315 |
| 2007/0144848 A1 | 6/2007 | Saito | |
| 2008/0115663 A1* | 5/2008 | Hammer | 92/143 |

FOREIGN PATENT DOCUMENTS

| | | |
|---|---|---|
| DE | 3925470 A1 | 3/1990 |
| DE | 4011921 C1 | 7/1991 |
| DE | 4139821 A1 | 6/1993 |
| DE | 102005023756 A1 | 11/2006 |
| DE | 602004003754 T2 | 10/2007 |
| DE | 102006047093 A1 | 4/2008 |
| EP | 0545687 A2 | 6/1993 |
| EP | 2103836 A2 | 9/2009 |
| GB | 2123922 A | 2/1984 |
| JP | 2002213515 A | 7/2002 |

* cited by examiner

DAMPER

CROSS-REFERENCES TO RELATED APPLICATIONS

This application claims the priority of German Patent Application, Serial No. 10 2010 029 180.3, filed May 20, 2010, pursuant to 35 U.S.C. 119(a)-(d), the content of which is incorporated herein by reference in its entirety as if fully set forth herein.

FIELD OF THE INVENTION

The invention relates to a damper, in particular a hydraulic damper.

BACKGROUND OF THE INVENTION

Hydraulic dampers are known, for example, from DE 10 2005 023 756 A1.

The force-speed characteristic can be adapted here by means of an adjustment system.

SUMMARY OF THE INVENTION

The invention is based on an object of improving a damper with an adaptable force-speed characteristic.

This object is achieved by a damper comprising a housing, which encloses a working chamber and a compensating chamber and has a centre longitudinal axis, a damping fluid located at least partially in the working chamber, a guide and sealing unit, which terminates the housing at a first housing end, a piston device comprising a piston rod, which, sealed by the guide and sealing unit, is guided out of the housing, and a piston fastened to the piston rod and guided in the housing along the centre longitudinal axis, wherein the piston divides the working chamber into a first part working chamber with a first working chamber end and a second part working chamber with a second working chamber end, arranged at the first working chamber end is a first closing element, with a first compensating channel, which forms a through-flow connection between the first part working chamber and the compensating chamber, arranged at the second working chamber end is a second closing element, with a second compensating channel, which forms a through-flow connection between the second part working chamber and the compensating chamber, and the piston device has at least one through-flow channel, which forms a through-flow connection between the part working chambers, and the at least one through-flow channel has an effective flow cross section which is adjustable by means of an adjusting element.

The core of the invention is to configure in the damper at least one through-flow channel with an adjustable effective flow cross section. As the damping force characteristic depends on precisely this flow cross section, it can be adapted in a particularly simple manner.

The through-flow channel with the adjustable flow cross section is arranged, in particular, in the interior of the piston rod. On the one hand, this leads to a structure of the damper which is easy to produce and, on the other hand, to a particularly robust embodiment.

The adjusting element is also preferably at least partially, in particular completely, arranged in the piston rod. This also leads to a particularly robust embodiment of the damper. In principle, it is also made possible thereby to provide already existing dampers with an adjusting device, in particular with a blocking function, by exchanging the piston rod.

The through-flow channel can be closed completely by means of the adjusting element. A blocking capacity, in other words a locking, of the damper can be achieved by this.

The adjusting element can preferably be actuated by rotation. This makes possible an adjustability of the damper which is particularly easy to implement. As an alternative to this, the adjusting element may also be actuated by shifting in the direction of the centre longitudinal axis. In general, the adjusting element can be actuated mechanically by displacement with respect to the centre longitudinal axis.

Furthermore, it may be provided that the damper has valves in one or both of the compensating channels between the working chamber and the compensating chamber. These are preferably automatic valves. The valves are, in particular, one-way valves. They may have an overload protection. By targeted selection and arrangement of the valves it can be achieved that the damper can be blocked exclusively in the pulling or pushing direction or in both directions, as required.

According to one embodiment, an annular gap valve is provided at one end of the working chamber of the damper. This has a valve ring, which is arranged on the piston rod with frictional engagement and shiftably and, in particular, in a sealed manner. The annular gap valve can therefore be actuated by shifting the piston rod in the direction of the centre longitudinal axis. Upon pressure on the piston rod in the direction of the centre longitudinal axis, the annular gap valve opens automatically. On the other hand, the valve ring, upon pulling on the piston rod, is entrained thereby and pressed against the valve seat, whereby the annular gap valve closes and therefore prevents further overflowing of damping fluid from the working chamber into the compensating chamber. Owing to the cooperation of the adjusting device and the valves in the compensating channels, a unidirectional or bidirectional blocking capacity of the damper is made possible as required. For this purpose, the valves may, in particular, be arranged in the compensating channels in such a way that upon a shifting of the piston, one opens in each case, while the other closes, in each case.

Overload protection elements, which ensure, when a predetermined limit force is exceeded, that the through-flow connection opens, may be provided in the through-flow connections. This may be advantageous for technical safety reasons. Moreover, damage to the damper may thus be avoided.

The piston rod may, in particular, have an outer sleeve and an inner core, which can be displaced relative to one another. The core forms the adjusting element here, by means of which the effective flow cross section in the through-flow channel in the piston rod can be adjusted, in particular closed.

Features and details of the invention emerge from the description of a plurality of embodiments with the aid of the drawings.

DESCRIPTION OF THE PREFERRED EMBODIMENTS

Figure 1:
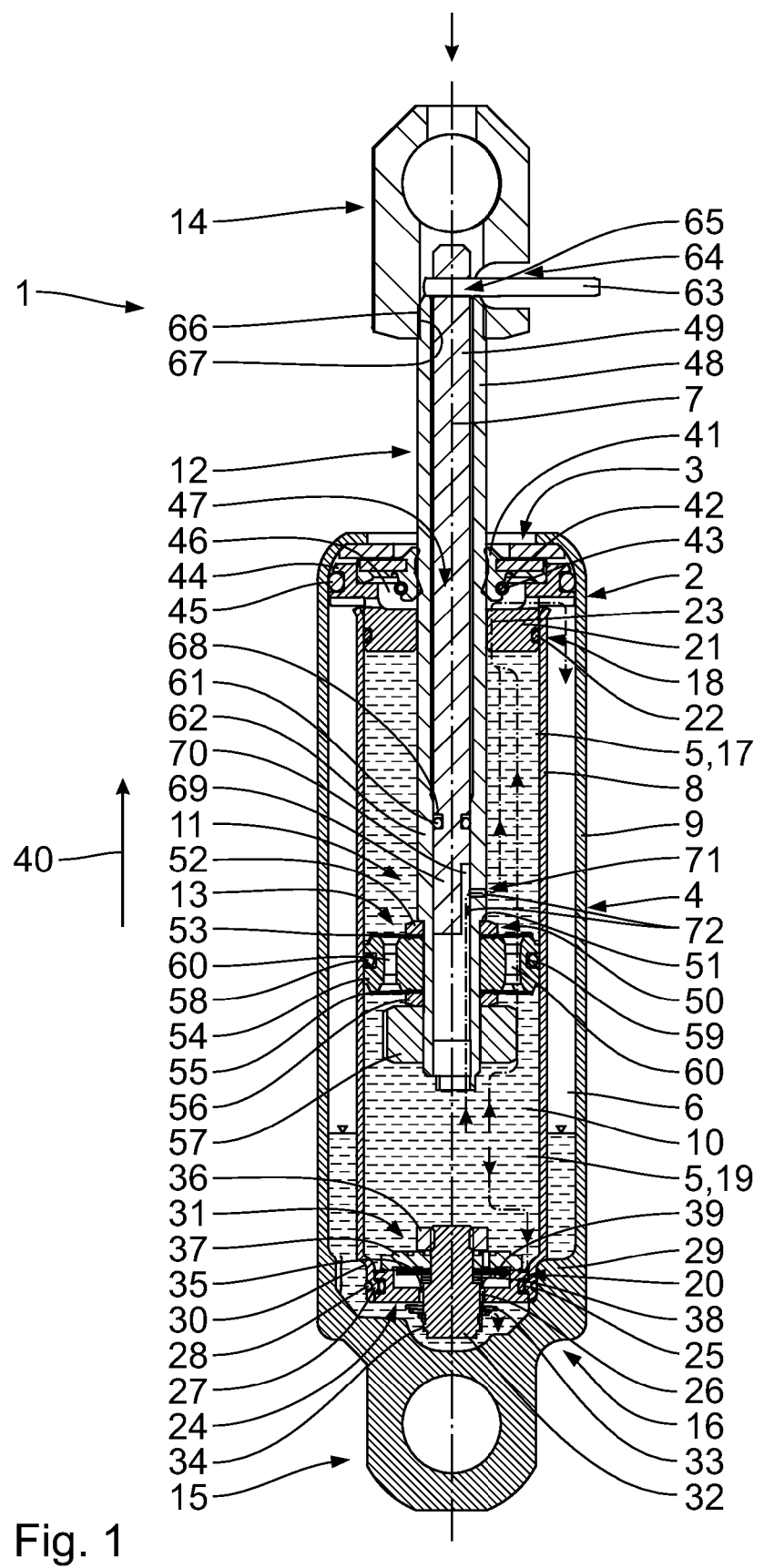
FIG. 1 shows a longitudinal section through a damper, the flow conditions in the through-flow connections with pressure loading on the piston rod being shown schematically.

A first embodiment of the invention will be described below with reference to FIGS. 1 to 8. A damper 1 has a housing 4 with a first housing end 2 and a second housing end 16. The housing 4 is terminated at the first housing end 2 by a guide and sealing unit 3. The housing 4 has a second fastening element 15 at the second housing end 16. The housing 4 encloses a working chamber 5 and a compensating chamber 6. The housing 4 has a centre longitudinal axis 7. It is, in particular, configured, at least in portions, rotationally symmetrically with respect to the centre longitudinal axis 7. The housing 4 may be double-walled. It is comprises, in particular, an inner housing 8 and an outer housing 9. The outer housing 9 surrounds the inner housing 8. The outer housing 9 may, in particular, be arranged concentrically with respect to the inner housing 8. The compensating chamber 6 is therefore configured as an annular cylindrical cavity.

In an alternative variant, not shown in the figures, the outer housing 9 may be arranged offset with respect to the inner housing 8 in such a way that the compensating chamber 6, along its periphery, has a variable, in other words not constant, width. In this case, the compensating chamber 6 may, in particular, be configured so that it can be drawn together topologically.

The working chamber 5 is filled with a damping fluid 10. The damping fluid 10 is, in particular, a hydraulic oil. The compensating chamber 6 is partially filled with the damping fluid 10. The remainder of the compensating chamber 6 is filled with gas, in particular with air.

The guide and sealing unit 3 comprises a first sealing element 41, which rests in a sealed manner on the piston rod 12. For retention on the piston rod 12, the first sealing element 41 has an annular groove 42, in which a clamping ring 43 is arranged. Furthermore, the guide and sealing unit 3 comprises a support element 44 which is outwardly supported against the outer housing 9. The support element 44 is mounted in a sealed manner against the outer housing 9 by means of a sealing ring 45. It has a central blind hole 46. The guide and sealing unit 3 has a central bore 47. The bore 47 is arranged, in particular, concentrically with respect to the centre longitudinal axis 7. The piston rod 12 is guided through the bore 47.

The damper 1 moreover comprises a piston device 11 with a piston rod 12 and a piston 13. The piston 13 is fastened to the piston rod 12 and shiftably guided in the inner housing 8 along the centre longitudinal axis 7. The piston rod 12, sealed by the guide and sealing unit 3, is guided out of the housing 4. The piston rod 12 is connected, at its end opposing the piston 13, to a first fastening element 14.

The piston 13 divides the working chamber 5 into a first part working chamber 17, which faces the first housing end 2, with a first working chamber end 18 and a second part working chamber 19 facing the second housing end 16 with a second working chamber end 20.

Arranged on the first working chamber end 18 is a first closing element 21. The first closing element 21 is arranged in the inner housing 8. The first closing element 21 may, in particular, be inserted into the inner housing 8, preferably pressed in or screwed in. It is sealed relative to the inner housing 8 by means of a sealing ring 22. The first closing element 21 is configured in one piece with the support element 44. It is therefore also a component of the guide and sealing unit 3. In principle, however, it is also conceivable for the first closing element 21 and the support element 44 to be configured as separate parts.

The first closing element has a first compensating channel 23, which forms a through-flow connection indicated by arrows in the figures, between the first part working chamber 17 and the compensating chamber 6. Reference is made to DE 10 2005 023 756 A1 for further details with respect to the embodiments of the first closing element 21.

A second closing element 24 is arranged on the second working chamber end 20. The second closing element 24 is arranged in the inner housing 8. The second closing element 24 may, in particular, be inserted in the inner housing 8, preferably pressed in. The second closing element 24 is held in the region of the second working chamber end 20 by a peripheral bead 27 in the inner housing 8. To improve the hold of the second closing element 24, the bead 27 may be reinforced by a clamping ring 28. Moreover, the inner housing 8 in the region of the second working chamber end 20, in particular in the region of the bead 27, may rest peripherally in regions on the outer housing 9. The outer housing 9, for this purpose, has step-like reinforcements 29, on which a bearing shoulder 30 of the inner housing 8 positively rests.

The second closing element 24 is sealed relative to the inner housing 8 by means of a sealing ring 25. It has a second compensating channel 26, which forms a through-flow connection between the second part working chamber 19 and the compensating chamber 6.

For proper functioning of the damper 1, the working chamber 5 should always be filled completely with damping fluid 10. This may be achieved by a suitable configuration and arrangement of the second compensating channel 26 and a quantity of damping fluid 10 adapted to the volume of the working chamber 5 and the configuration of the compensating chamber 6. The damper 1, in particular, has a preferred installation position in such a way that the push-out direction 40 opposes the direction of gravity. The proper functioning of the damper 1 can then be ensured up to a rotation angle of at least 77° from the preferred installation position.

A compensating valve 31 is provided in the second compensating channel 26. The compensating valve 31 in particular comprises a valve pin 32, which is prestressed against the second closing element 24 by means of a conically tapering valve helical spring 33. The valve helical spring 33 rests, for this purpose, on a valve pin stop 34. The valve pin 32 is guided in a bore 35 in the second closing element 24. The bore 35 is, in particular, arranged concentrically with respect to the centre longitudinal axis 7. Moreover, the compensating valve 31 comprises a polygonal valve nut 36 arranged on the valve pin 32. The valve nut 36 forms a further stop, against which a spacer washer 37 arranged on the valve pin 32 rests. A valve plate spring 38 and a valve disc 39 are arranged adjacent to the spacer washer 37.

The compensating valve 31 is configured as an automatic valve. It may be configured as a one-way valve. It is in particular configured in such a way that it allows a flow from the compensating chamber 6 through the second compensating channel 26 into the second part working chamber 19. In other words, the compensating valve 31 is configured in such a way that it opens upon a movement of the piston 13 in a push-out direction 40 parallel to the direction of the centre longitudinal axis 7.

Figure 2:
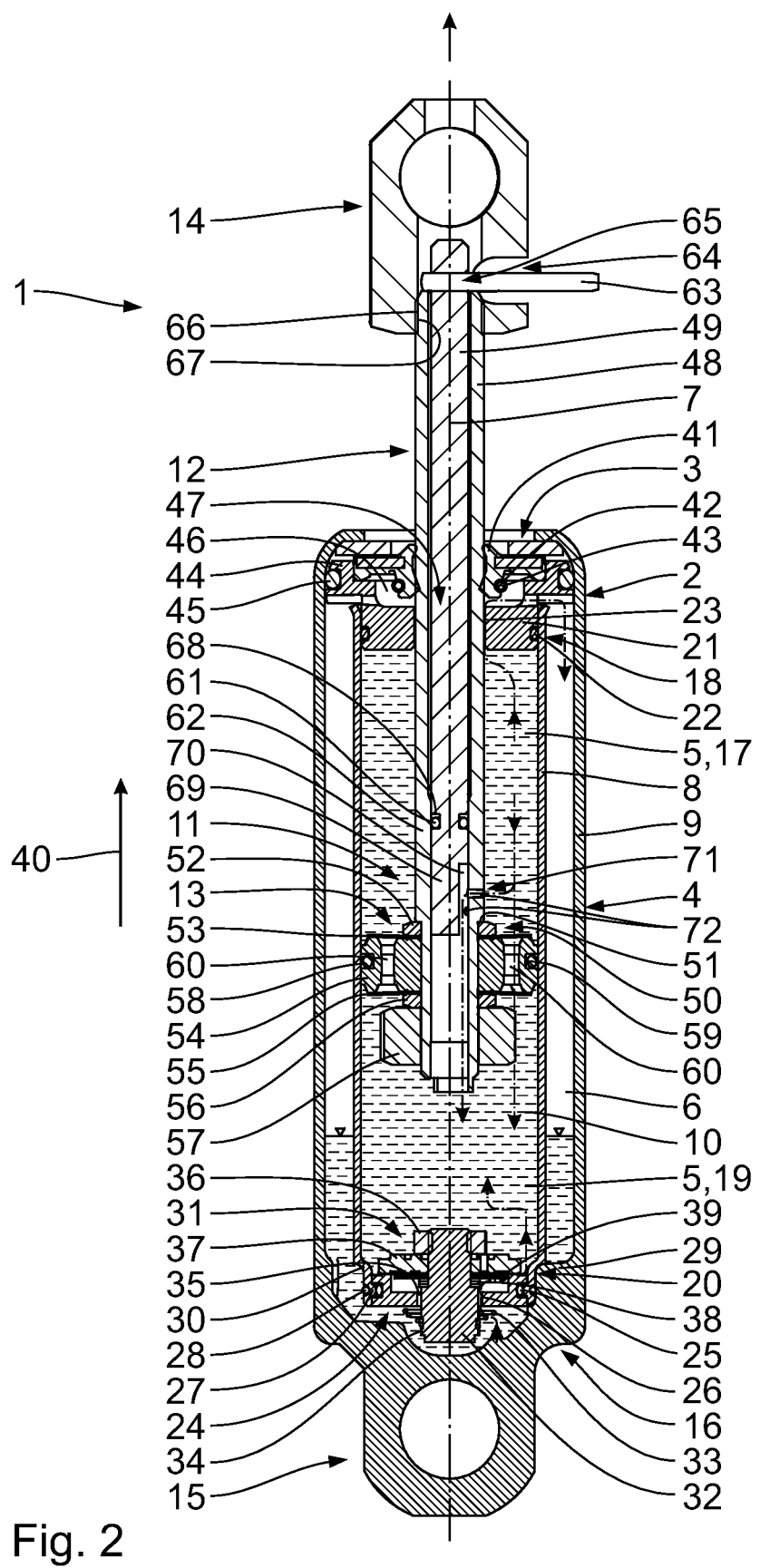
FIG. 2 shows a view according to FIG. 1, the flow conditions in the through-flow connections upon tensile loading on the piston rod being shown schematically.
Figure 3:
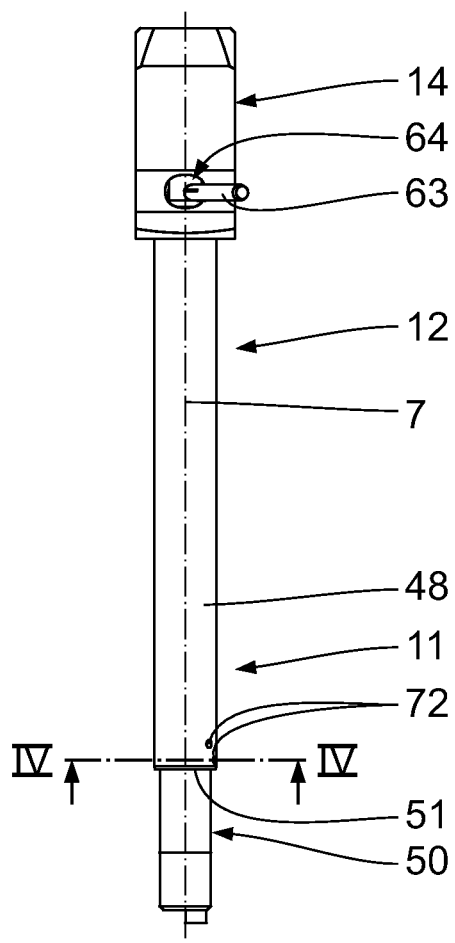
FIG. 3 shows a detailed view of the piston rod of the damper, the adjusting element being in a completely open position.
Figure 4:
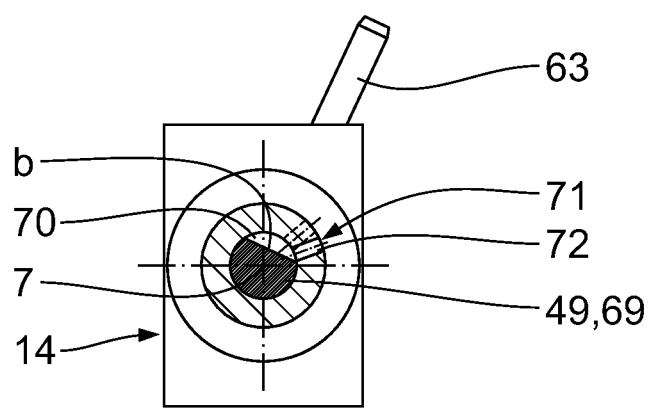
FIG. 4 shows a cross section through the piston rod according to FIG. 3 along the line IV-IV.

In the embodiment shown in FIGS. 1 and 2, the compensating valve 31 is configured in such a way that it allows a bidirectional flow through the second compensating channel 26. It is therefore configured as a two-way valve. The compensating valve 31 may, in particular, have embossings, which, regardless of the position of the valve disc 39 allow a bidirectional through-flow between the second part working chamber 19 and the compensating chamber 6.

In general, it is provided that the compensating valve 31 forms an overload protection element, which, when a predetermined limit force is exceeded in the direction of the centre longitudinal axis 7 on the piston rod 12, ensures that the second compensating channel 26 is open. The activation characteristic of this overload protection can be achieved by suitable selection and dimensioning of the valve helical spring 33 and the valve plate spring 38, in a simple manner.

An alternative design structure of the compensating valve 31 is conceivable. Reference is made to DE 10 2005 023 756 A1, in particular paragraph [0022] with regard to further details of the compensating valve 31.

The piston rod 12 is multi-part, in particular two-part. It comprises an outer, tubular piston rod sleeve 48 and a piston rod core 49.

The piston rod sleeve 48 may be connected to the first fastening element 14. The first fastening element 14 may, for this purpose, have an internal thread 66, by means of which the first fastening element 14 is screwed onto an external thread 67, which fits therewith, on the piston rod sleeve 48.

The piston rod core 49 is sealed against the piston rod sleeve 48 by means of a sealing ring 61. The sealing ring 61 is arranged in an annular groove 68 on the piston rod core 49. In the region of the sealing ring 61, the piston rod sleeve 48 is inwardly reinforced, in other words radially with respect to the centre longitudinal axis 7. It has a reinforcement 62 here. Apart from the groove 68, the piston rod core 49 in the region of the reinforcement 62 is fully cylindrical. The piston rod core 49 rests positively on the piston rod sleeve 48 in the region of the reinforcement 62. It is thus mounted without play in the radial direction in the piston rod sleeve 48.

The piston rod core 49, in particular in the region of the reinforcement 62, has a circular cross section. It is therefore fully cylindrical at least in this region.

In an end region 69 adjoining this region counter to the push-out direction 40, the piston rod core 49 has a recess 70. The recess 70 is segment of a circle-shaped in the direction perpendicular to the centre longitudinal axis 7. It has a centre point angle b. The centre point angle b is at least 15°, in particular at least 30°, in particular at least 45°, in particular at least 60°, in particular at least 90°. It may in particular also be 120°. At most 270°, in particular at most 180°, are provided as the upper limit for the centre point angle b. In principle, a sector of a circle-shaped configuration of the recess 70 is also possible. The recess may also be configured as a bore in the piston rod core 49.

The recess 70 is part of a through-flow channel 71 which forms a through-flow connection between the part working chambers 17, 19. In addition to the recess 70, the through-flow channel 71 comprises a plurality of bores 72 in the piston rod sleeve 48. In other words, the bores 72 together with the recess 70 form the through-flow channel 71. The through-flow channel 71 is therefore arranged in the piston rod 12.

At least one bore 72 is provided in the piston rod sleeve 48. In the embodiment shown in FIGS. 1 to 8, the piston rod sleeve 48 has two bores 72. It may also have three, four, five or more bores 72. The bores 72 are in each case arranged offset with respect to one another in the peripheral direction. The bores 72 all have the same size. However, bores 72 of different sizes are also conceivable.

As an alternative to a plurality of discrete bores 72, the piston rod sleeve 48 may also have an elongate through-flow opening. The through-flow opening preferably extends in the peripheral direction. It covers an angle range, which is at most as great as the centre point angle b of the recess 70 in the piston rod core 49.

The bores 72 are selectively closable by means of the end region 69 of the piston rod core 49. The end region 69 of the piston rod core 49 thus forms an adjusting element, by means of which the effective flow cross section of the through-flow channel 71 can be adjusted. The adjusting element to adjust the effective flow cross section of the through-flow channel 71 is therefore arranged in the interior of the piston rod 12, in particular in the interior of the piston rod sleeve 48.

The through-flow channel 71 is, in particular, closable by means of the adjusting element to interrupt the through-flow connection between the part working chambers 17, 19. As a result, the damper 1 can be blocked.

A plurality of discrete bores 72 allows a plurality of different discrete damping adjustments of the damper 1. The damper 1 can therefore have a step-like damping characteristic. On the other hand, an elongate opening in the piston rod sleeve 48 allows a continuously adjustable damping behaviour of the damper 1.

The piston rod core 49 can be displaced, in particular rotated, against the piston rod sleeve 48. It is connected, for this purpose, to an adjusting lever 63. The adjusting lever 63 is connected to the piston rod core 49 in the region of the first fastening element 14. The first fastening element 14, for this purpose, has a recess 64. The adjusting lever 63 is, in particular, arranged in a bore 65 in the piston rod core 49. The bore 65 runs perpendicular to the centre longitudinal axis 7. It may be provided that the adjusting lever 63 is provided with an external thread and the bore 65 with an internal thread fitting therewith. The adjusting lever 63 may, in particular, be screwed into the piston rod core 49. This allows particularly simple assembly. Moreover, a simple replaceability of the adjusting lever 63 and the piston rod core 49 is thereby made possible. It is also conceivable to configure the piston rod core 49 to be shiftable with respect to the piston rod sleeve 48.

The adjusting lever 63 may rest on the piston rod sleeve 48 in the direction of the centre longitudinal axis 7. It therefore fixes the piston rod core 49 against unintentional shifting relative to the piston rod sleeve 48 counter to the push-out direction 40. A fixing of the piston rod core 49 in the piston rod sleeve 48 against shifting with respect to the centre longitudinal axis 7 may also be achieved with alternative, separate fixing means.

The piston rod sleeve 48, on a first piston rod end 50 arranged in the inner housing 8, has a reduced external diameter, whereby a piston rod stop 51 is formed. Arranged on the piston rod sleeve 48 in the region of the first piston rod end 50, proceeding from the piston rod stop 51 are a first spacer washer 52, a first closing element 53, in particular in the form of a plate spring, a piston disc 54, a second closing element 55, in particular in the form of a plate spring, a second spacer washer 56 and a securing nut 57. The securing nut 57 is screwed onto a piston rod thread and secures the piston 13 on the piston rod 12. The piston 13 is formed by the first closing element 53, the piston disc 54, the second closing element 55 and a piston seal 58. The piston seal 58 is annular and arranged in an annular groove 59 in the piston disc 54. The piston seal 58 therefore seals the piston disc 54 against the inner housing 8.

A plurality of through-flow channels 60 are provided in the piston disc 54. The through-flow channels 60 form a through-flow connection between the first part working chamber 17 and the second part working chamber 19. The closing elements 53, 55 cooperate, in each case, with at least one of the through-flow channels 60. They can also cooperate with a plurality of the through-flow channels 60. They can, in particular, act as a valve element and influence the efficient flow cross section of the through-flow channels 60 depending on a movement direction and/or speed of the piston 13 with respect to the push-out direction 40. They may, in particular, be configured in such a way that exclusively a unidirectional flow through the through-flow channel 60 is possible. In this case, the closing elements 53, 55 form a one-way valve. The closing elements 53, 55 may, in particular, be configured in such a way that they open when a specific limit force is exceeded. In this case they form an overload protection.

An alternative configuration of the piston 13 is conceivable. Reference is made to the description of DE 10 2005 023 756 A1, in particular paragraph [0023] f. in this regard and for further details with regard to the through-flow channel 60 and the closing elements 53, 55. It is, in particular, also possible to configure the piston 13 sealed, in other words without through-flow channels 60. In this case, the part working chambers 17, 19 are separated in a fluid-tight manner by the piston 13. The through-flow channel 71 in the piston rod 12, in this case, forms the only direct through-flow connection between the part working chambers 17, 19.

The adjustability of the effective flow cross section of the through-flow channel 71 by means of the end region 69 forming the adjusting element, of the piston rod core 49 will be described below. The adjusting element can be actuated by a displacement with respect to the centre longitudinal axis 7, in particular by rotation. It is also conceivable to provide an adjusting element which can be actuated by shifting with respect to the centre longitudinal axis 7. The adjusting element can be actuated, in particular by means of the adjusting lever 63. Different positions of the adjusting element are shown in FIGS. 3 to 8. In the adjustment position shown in FIGS. 3 and 4, the end region 69 of the piston rod core 49 does not cover any of the bores 72. The two bores 72 therefore contribute to the effective flow cross section of the through-flow channel 71. The through-flow channel 71, in other words, has its largest possible effective flow cross section. The damping of a movement of the piston rod 12 is minimal, in other words, the resistance against a movement of this type in or counter to the push-out direction 40 is as small as possible. The damper 1, in this adjustment position, has its softest possible damping.

Figure 5:
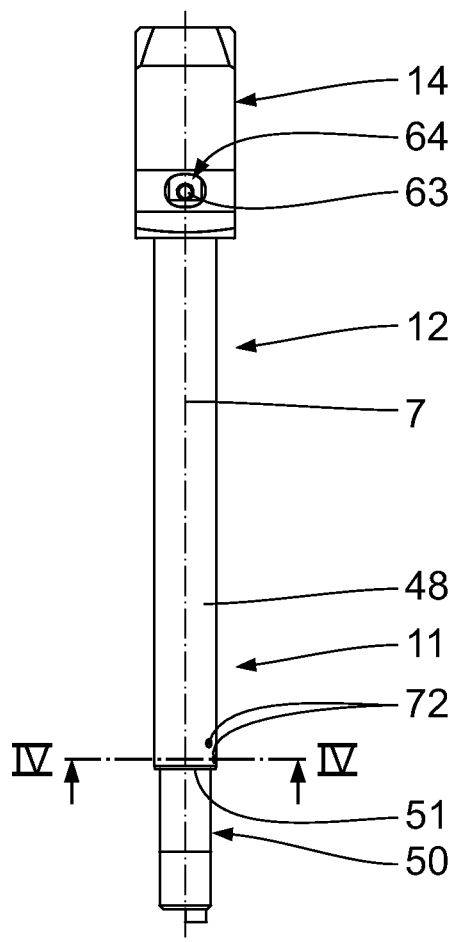
FIGS. 5 and 6 show views of the piston rod corresponding to FIGS. 3 and 4, the adjusting element being shown in an intermediate position.
Figure 6:
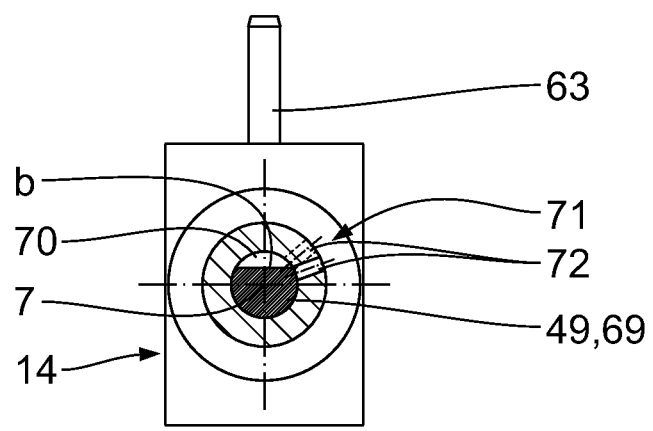

In the adjustment position shown in FIGS. 5 and 6, the end region 69 of the piston rod core 49 covers one of the bores 72, while the other one remains open. As a result, the effective flow cross section is reduced to half in comparison to the adjustment position shown in FIGS. 3 and 4. The damping of the damper 1 is therefore harder.

Figure 7:
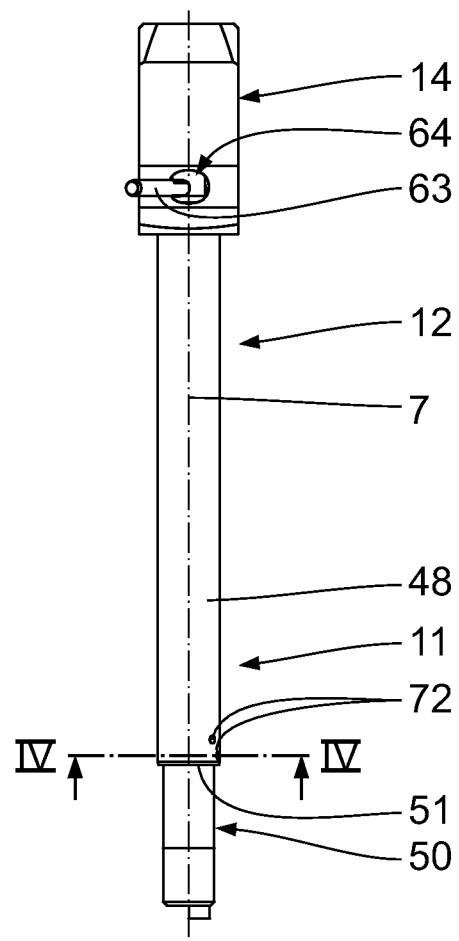
FIGS. 7 and 8 show corresponding views with the adjusting element in the completely closed locking position.
Figure 8:
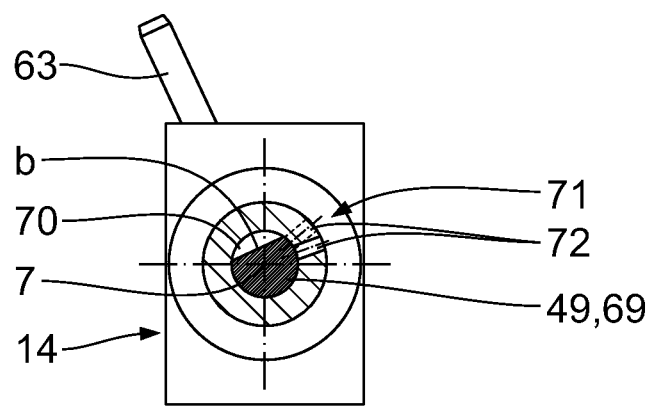
Figure 9:
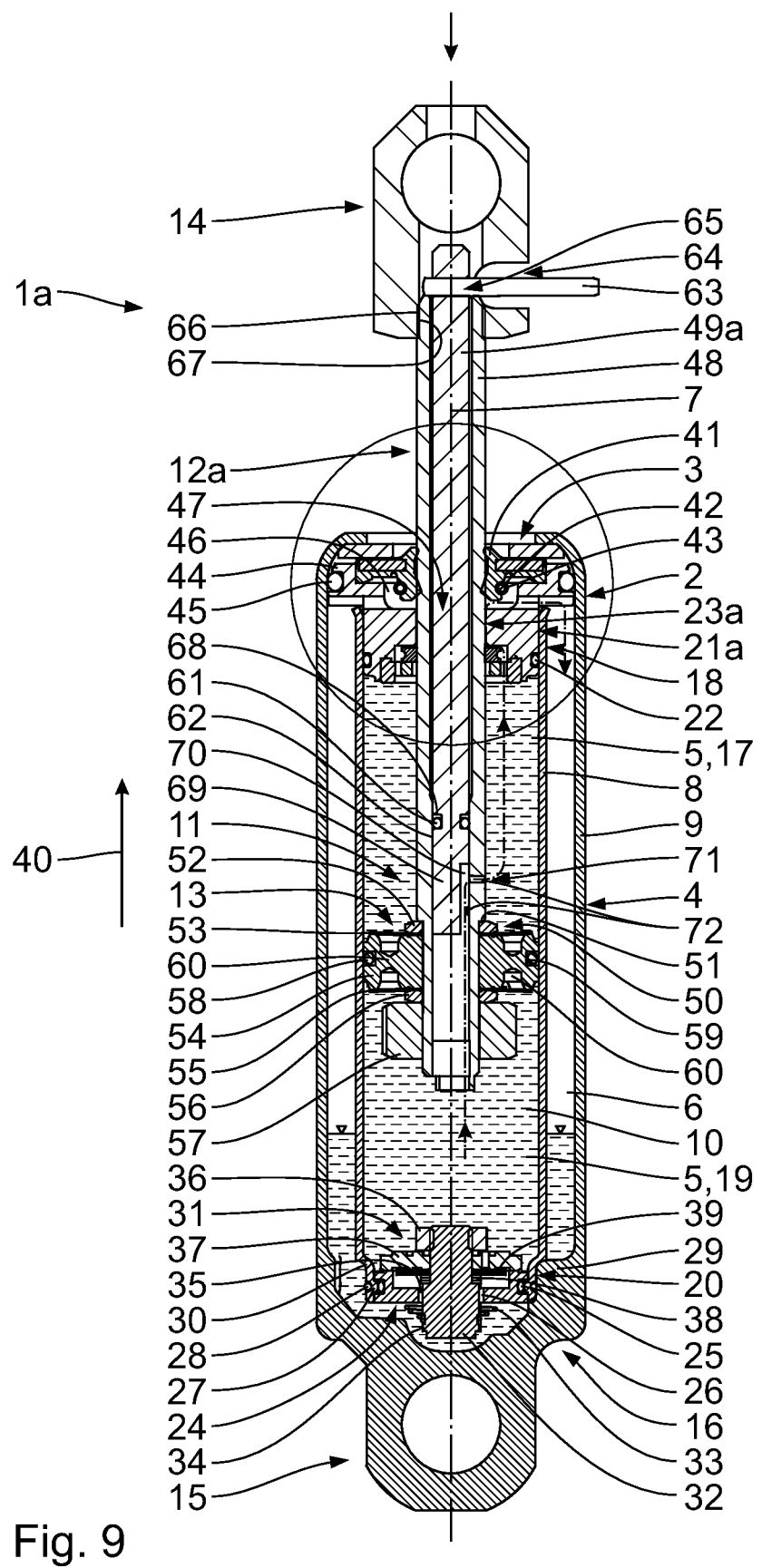
FIGS. 9 and 10 show views corresponding to FIGS. 1 and 2 of a further damper.
Figure 10:
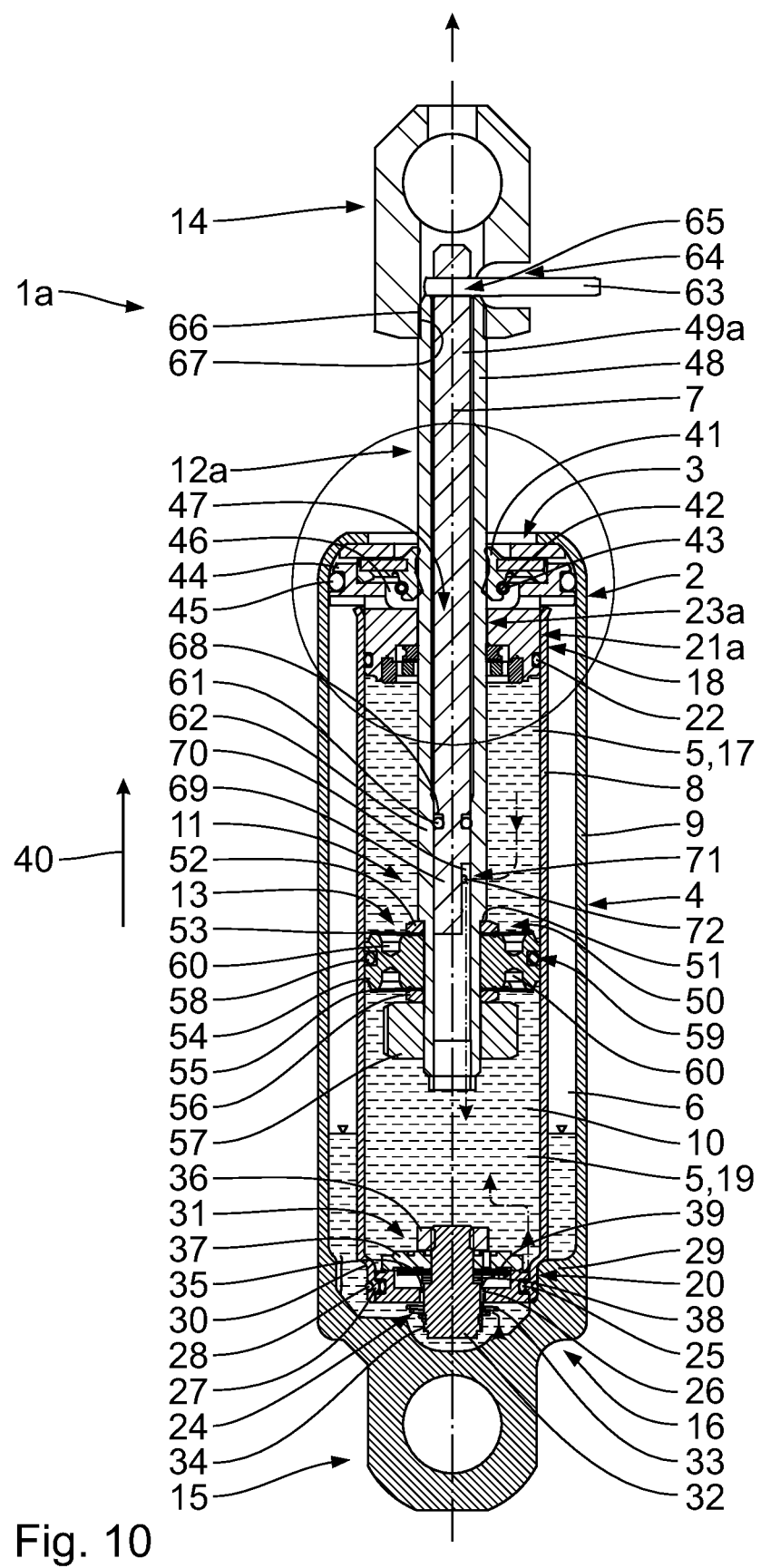
Figure 11:
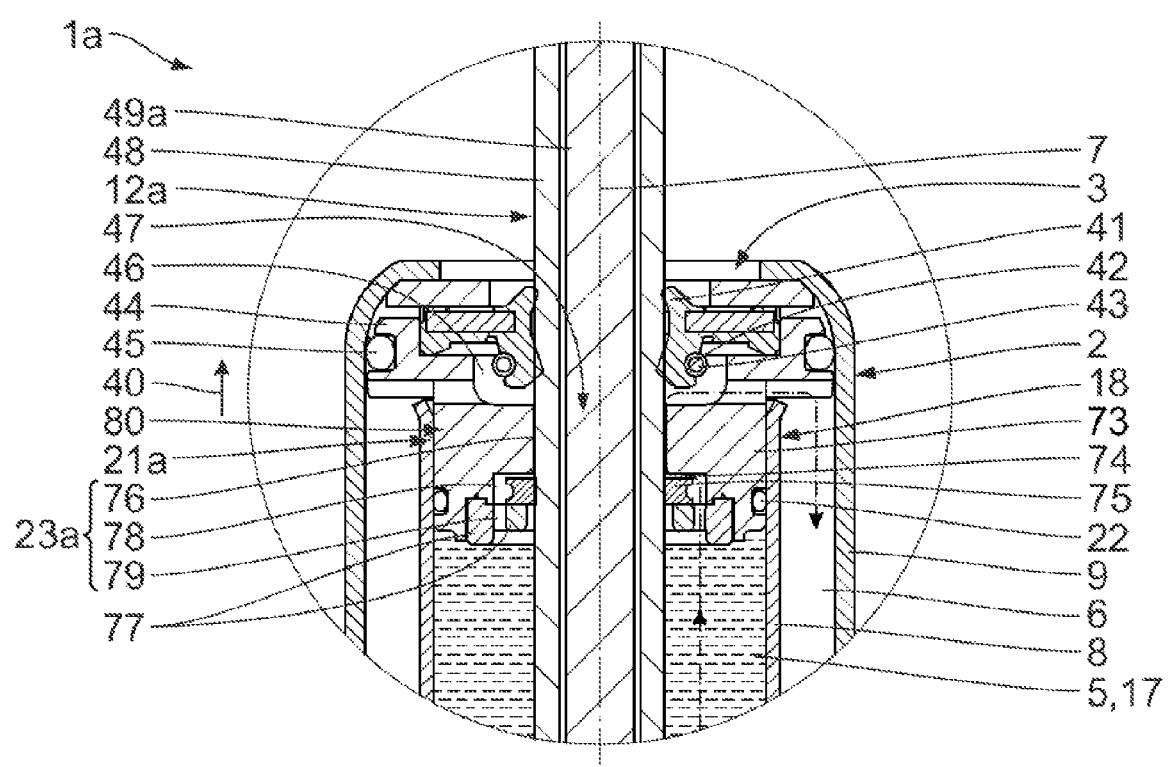
FIGS. 11 and 12 show detail enlargements from FIGS. 9 and 10.
Figure 12:
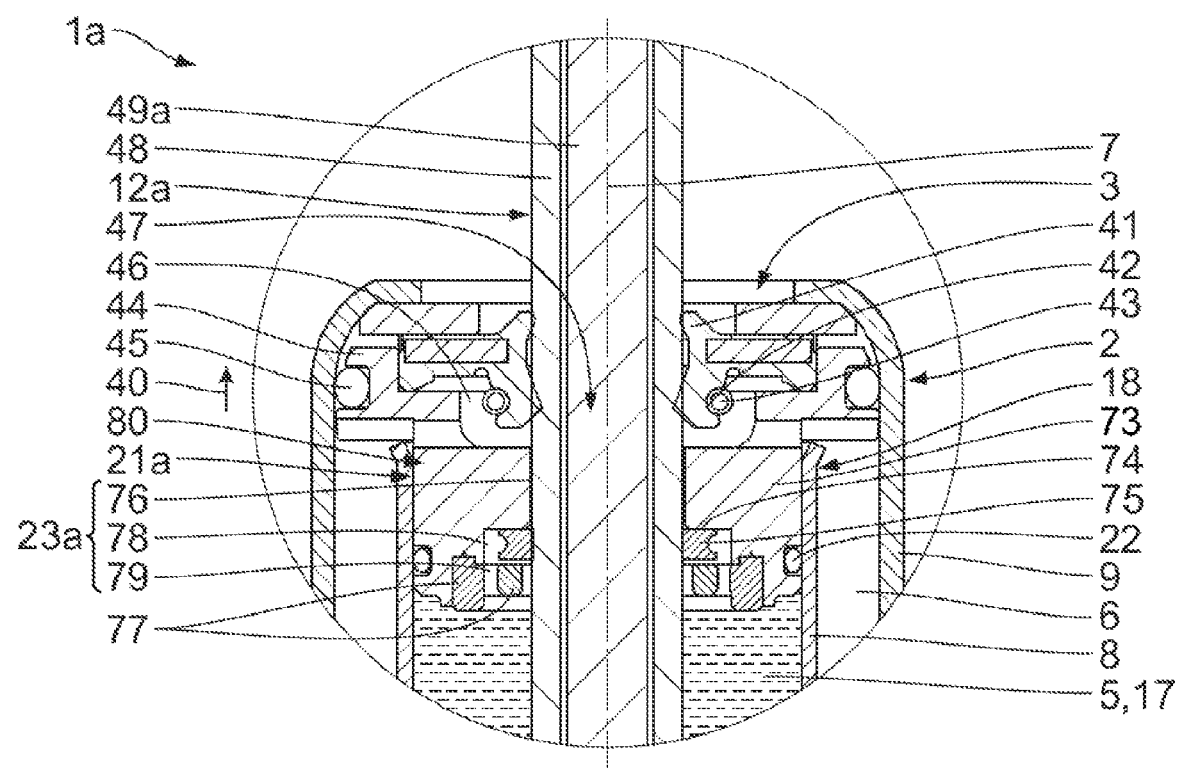

In the adjustment position shown in FIGS. 7 and 8, the end region 69 of the piston rod core 49 covers both, in other words all the bores 72. The through-flow channel 71 is closed in this position. Its effective flow cross section is zero. The through-flow connection between the part working chambers 17, 19 through this through-flow channel 71 is interrupted. A through-flow connection for the damping fluid 10 between the part working chambers 17, 19 is at most provided via the compensating channels 23, 26 and the compensating chamber 6. The damping of a movement of the piston rod 12 is maximal in this adjustment position, in other words the resistance against a movement of the piston rod 12 in or counter to the push-out direction 40 is as great as possible. In this adjustment position, the damper 1 has its hardest possible damping. It may, in particular, be blocked.

The function of the damper 1 will be described below. In the adjustment position shown in FIGS. 1 and 2 of the adjusting element, the through-flow channel 71 in the piston rod 12 is maximally opened. Upon a movement of the piston 13 counter to the push-out direction 40, the damping fluid 10 can therefore flow from the second working chamber 19 through the through-flow channel 71 in the piston rod 12 into the first part working chamber 17. Moreover, the damping fluid 10 displaced by the additional volume of the piston rod 12 from the working chamber 5 can flow through the first compensating channel 23 into the compensating chamber 6.

It is provided that the second compensating channel 26, with small forces directed against the push-out direction 40 on the piston rod 12, is closed as far as possible, in particular with small speeds of the piston 13, against the push-out direction 40. With a compensating valve 31, which allows a bidirectional flow through the second compensating channel 26, the compensating valve 31 is not completely closed. Because of the embossings, a bidirectional flow through the second compensating channel 26 is always possible. In principle, however, it is also possible to configure the compensating valve 31 as a one-way valve, which, with small forces directed against the push-out direction 40 on the piston rod 12, is in a blocking position. The response behaviour of the compensating valve 31 is determined by a suitable selection and adjustment of the valve helical spring 33 and the valve plate spring 38.

Accordingly, the through-flow channel 60 in the piston 13 may be closed by the first and/or second closing element 53, 55 with small speeds of the piston 13.

Upon a movement of the piston 13 in the push-out direction, the damping fluid 10 can flow from the first part working chamber 17 through the through-flow channel 71 in the piston rod 12 into the second part working chamber 19. Moreover, the compensating valve 31 opens and allows damping fluid 10 to flow from the compensating chamber 6 through the second compensating channel 26 into the second part working chamber 19. This ensures that the working chamber 5, apart from the volume displaced by the piston device 11, is always filled completely with damping fluid 10.

The compensating valve 31 in the second closing element 24 and/or the closing elements 53, 55 in the piston 13 may be configured in such a way that upon a movement of the piston rod 12 in the push-out direction 40, a through-flow of damping fluid 10 through the second compensating channel 26 in the second closing element 24 and/or the through-flow channel 60 in the piston 13 only takes place with a large push-out speed of the piston rod 12 or a large force in the push-out direction 40 thereon.

The through-flow channel 60 in the piston 13 and/or the compensating valve 31 in the second closing element 24 therefore act as an overload protection, which triggers in the case of high speeds and/or forces on the piston rod 12 and thereby prevents damage to the damper 1. Obviously, the damping behaviour of the damper 1 can be influenced as required by a suitable selection of the closing elements 53, 55 of the through-flow channel 60 and/or of the valve elements 33, 38 of the compensating valve 31.

By means of a rotation of the piston rod core 49 about the centre longitudinal axis 7 by means of the adjusting lever 16, the bores 72 of the through-flow channel 71 in the piston rod 12 can be closed by the end region 69 of the piston rod core 49. As a result, the effective flow cross section of the through-flow channel 71 in the piston rod 12 is reduced, in particular closed, in particular completely closed. A through-flow of damping fluid 10 from the first part working chamber 17 through the through-flow channel 71 into the second part working chamber 19 or vice versa, is then no longer possible.

Inasmuch as the compensating valve 31 prevents a through-flow of damping fluid 10 from the second part working chamber 19 into the compensating chamber 6, the piston rod 12, in this position of the adjusting element formed by the piston rod core 49, in particular its end region 69, is blocked against a displacement counter to the push-out direction 40 because of the completely closed volume of the second part working chamber 19.

If the force on the piston rod 12 in the direction counter to the push-out direction 40 exceeds a predetermined limit force, however, the overload protection is activated and the through-flow channel 60 in the piston 13 and/or the second compensating channel 26 in the second closing element 24, is opened.

As the compensating valve 31 in the second closing element 24 opens upon a movement of the piston 13 in the push-out direction 40 to allow damping fluid 10 to flow from the compensating chamber 6 into the second part working chamber 19, and the first compensating channel 23 in the first closing element 21 is in any case open, the damper 1, even with a closed through-flow channel 71 in the piston rod 12, is not completely blocked against a movement of the piston rod 12 in the push-out direction 40. However, it has a maximally hard damping as the damping fluid 10 cannot flow through the through-flow channel 71 in the piston rod 12 from the first part working chamber 17 into the second part working chamber 19, but flows from the first part working chamber 17 through the first compensating channel 23 into the compensating chamber 6 and from the compensating chamber 6 through the second compensating channel 26 into the second part working chamber 19. The damping characteristic is therefore determined, in this case, by the compensating channels 23, 26 and, in particular, by the compensating valve 31.

In an alternative configuration it may be provided that the closing elements 53, 55 are to be configured in such a way that the through-flow channels 60 in the piston 13 open and close depending on the speed of the movement of the piston rod 12 in the push-out direction 40. As a result, a speed-dependent damping characteristic can be achieved. For details in this regard reference is made to DE 10 2005 023 756 A1, paragraph [0028] ff.

A further embodiment of the invention will be described below with reference to FIGS. 9 to 12. Identical parts receive the same reference numerals as in the first embodiment, to the description of which reference is hereby made. Structurally different, but functionally similar parts receive the same reference numerals with an a thereafter. According to this embodiment, the first closing element 21a comprises an annular gap valve 80, which forms a compensating valve between the first part working chamber 17 and the compensating chamber 6. The annular gap valve 80 comprises a valve body 73, which is arranged, sealed by means of the sealing ring 22, in the inner housing 8. A first annular gap 76, which is part of a first compensating channel 23, is configured between the valve body 73 and the piston rod 12a. The valve body 73 has a shoulder extending radially with respect to the centre longitudinal axis 7 and forming a valve seat 74.

Furthermore, the annular gap valve 80 comprises a valve ring 75. The valve ring 75 is arranged with frictional engagement and displaceably and, in particular in a sealed manner, on the piston rod 12a. In the radial direction, the valve ring 75 is spaced apart from the valve body 73. As a result, a second annular gap 78 is formed between the valve ring 75 and the valve body 73. The valve ring 75 is movable relative to the valve seat 74 by a movement of the piston rod 12a with respect to the push-out direction 40. In a first position shown in FIG. 12a, which forms a closing position of the annular gap valve 80, the valve ring 75 rests in a sealing manner on the valve seat 74. In this position, it closes the first annular gap 76.

Moreover, the annular gap valve 80 comprises a stop element 77, which is inserted, in particular screwed, into the valve body 73 and limits the shiftability of the valve ring 75 in the direction of the centre longitudinal axis 7 relative to the valve seat 74. Provided in the stop element 77 are through-openings 79, which are arranged in the direction of the centre longitudinal axis 7 as an extension of the second annular gap 78.

In this embodiment, the first annular gap 76, the second annular gap 78 and the through-openings 79 form the first compensating channel 23a.

The first compensating channel 23a can be opened and closed by shifting the valve ring 75 in the push-out direction 40. Upon an insertion of the piston ring 12a counter to the push-out direction 40, the valve ring 75 is moved because of the friction between the piston rod 12a and the valve ring 75 relative to the valve body 73 counter to the push-out direction. As a result, it is lifted from the valve seat 74 and pressed against the stop element 77. In this position shown in FIG. 11, the valve ring 75 frees the first annular gap 76 and therefore the first compensating channel 23a. The annular gap valve 80 is therefore, in particular, configured as a one-way valve. Upon a movement of the piston rod 12a counter to the push-out direction 40 it opens and allows, in this position, damping fluid 10 to flow from the first part working chamber 17 through the first compensating channel 23a into the compensating chamber 6. On the other hand, the annular gap valve 80 closes upon a movement of the piston rod 12a in the push-out direction 40. A flow of damping fluid 10 through the first compensating channel 23a is not then possible.

In this embodiment, the piston rod core 49a positively rests, substantially over its entire length, on the piston rod sleeve 48. On its end facing the first fastening element 14, it has a larger diameter than at its end facing the second housing end 16. Obviously, the piston rod core 49a can also be configured in this embodiment in accordance with the configuration of the first embodiment.

The functioning of the damper 1a will be described again below taking into account the annular gap valve 80. In an opened position of the through-flow channel 71 in the piston rod 12a, in which the end region 69 of the piston rod core 49a forming the adjusting element does not cover the bores 72 in the piston rod sleeve 48, and the through-flow channel 71 in the piston rod 12a therefore forms a through-flow connection between the part working chambers 17, 19, the piston rod 12a is pressed, in the case of pressure, in other words in the event of a force counter to the push-out direction 40, against the latter into the working chamber 5. In this case, the valve ring 75 is moved counter to the push-out direction 40 because of the static or sliding friction between the piston rod 12a and the valve ring 75 and therefore lifted from the valve seat 74. As a result, the first annular gap 76 between the piston rod 12a and the valve seat 74, and therefore the first compensating channel 23a, is freed. Owing to the insertion movement of the piston rod 12a into the housing 4, the damping fluid 10 is pressed through the through-flow channel 71 in the piston rod 12a and optionally through the through-flow channels 60 in the piston 13. The through-flow channels 60 in the piston 13 form damping channels here, by means of which the characteristic of the damper 1a can be influenced. If necessary, a piston 13 without through-flow channels 60 can also be provided. Owing to the insertion movement of the piston rod 12a, the free volume in the working chamber 5 is reduced. The damping fluid 10 thereby displaced from the working chamber 5 flows through the opened first compensating channel 23a from the first part working chamber 17 into the compensating chamber 6.

With a force in the pulling direction on the piston rod 12a, in other words with a movement thereof in the push-out direction 40, the latter is pulled out of the working chamber 5. The valve ring 75 is thus moved in the push-out direction 40 because of the friction between the piston rod 12a and the valve ring 75 and thereby pressed onto the valve seat 74. As a result, the first annular gap 76 between the piston rod 12a and the valve body 73 is closed. The first compensating channel 23a is thereby closed. The damping fluid 10, in this position, cannot flow from the first part working chamber 17 through the first compensating channel 23a into the compensating chamber 6. When the piston rod 12a is pulled out of the housing 4, the volume claimed by the piston rod 12a in the working chamber 5 is reduced. In order to compensate this differential volume produced when the piston rod 12a is pulled out of the housing 4 in the working chamber 5, damping fluid 10 flows through the second compensating channel 26 from the compensating chamber 6 into the second part working chamber 19.

In this position, both an insertion of the piston rod 12a into the housing 4 and a pulling thereof out of the housing 4 is possible. The damping characteristic is provided here by the effective flow cross section of the through-flow channel 71 in the piston rod 12a and the flow cross sections of the compensating channels 23a, 26 and the response behaviour of the compensating valve 31 or the annular gap valve 80. Optionally, the damping characteristic of the damper 1a can be influenced as required by through-flow channels 60 and closing elements 53, 55.

With the through-flow channel 71 closed in the piston rod 12a, in other words when the adjusting element formed by the end region 69 of the piston rod core 49a closes the through-flow channel 71 to interrupt the through-flow connection between the part working chambers 17, 19, the following situation is produced. With a force on the piston rod 12a counter to the push-out direction 40, the piston rod 12a is pushed into the working chamber 5. In this case, the valve ring 75 is moved counter to the push-out direction 40 because of the static/sliding friction between the piston rod 12 and the valve ring 75 and therefore lifted from the valve seat 74. As a result, the first compensating channel 23a is opened. On the other hand, the compensating valve 31 on the second working chamber end 20 is closed in this case. The volume of the second part working chamber 19 is therefore completely closed. An insertion of the piston rod 12a into the housing 4 is therefore not possible. The piston rod 12a is therefore blocked. If the pressure force acting on the piston rod 12a exceeds a specific, predetermined maximum force, the compensating valve 31 opens and thereby prevents damage to the damper 1a. Optionally, an additional overload protection may be provided by through-flow channels 60 and closing elements 53, 55 in the piston 13.

Upon a movement of the piston rod 12a in the push-out direction 40, the valve ring 75 is pulled onto the valve seat 74. As a result, the first compensating channel 23a is closed. Damping fluid 10 cannot flow through the first annular gap 76. In this case, the first part working chamber 17 has a completely closed volume and thereby prevents a push-out movement of the piston rod 12a. An overload protection can again be achieved by suitable through-flow channels 60 with closing elements 53, 55 in the piston 13.

It is basically to be noted that the damper 1a blocks precisely when at least one of the part working chambers 17, 19 has a completely closed volume. When the through-flow channels 60 are closed or not present in the piston 13, this is precisely the case when at least two of the through-flow connections 23a, 26 and 71 are closed. It is to be noted in this regard that the second compensating channel 26 for reliable functioning of the damper 1a should always allow damping fluid 10 to flow out of the compensating chamber 6 into the working chamber 5.

By a suitable combination of valve and/or damping elements in the piston 13 and the first closing element 21a and/or the second closing element 24, in conjunction with the through-flow channel 71, which can be closed by the adjusting element, in the piston rod 12a, a damper with a flexibly predeterminable blocking capacity and damping characteristic can be produced.

What is claimed is:
1. A damper comprising
   a. a housing, which
      i. encloses a working chamber and a compensating chamber and
      ii. has a centre longitudinal axis,
   b. a damping fluid located at least partially in the working chamber,
   c. a guide and sealing unit, which terminates the housing at a first housing end,
   d. a piston device comprising
      i. a piston rod, which, sealed by the guide and sealing unit, is guided out of the housing, and
      ii. a piston fastened to the piston rod and guided in the housing along the centre longitudinal axis,
   wherein
   e. the piston divides the working chamber into a first part working chamber with a first working chamber end and a second part working chamber with a second working chamber end,
   f. arranged at the first working chamber end is a first closing element, with a first compensating channel, which forms a through-flow connection between the first part working chamber and the compensating chamber,
   g. arranged at the second working chamber end is a second closing element, with a second compensating channel, which forms a through-flow connection between the second part working chamber and the compensating chamber, and
   h. the piston device has a through-flow channel,
      i. said through-flow channel forming a bi-directional through-flow fluidly connecting the first and second part working chambers, and
      ii. said through-flow channel having an effective flow cross section which is adjustable by means of an adjusting element,
   i. wherein the piston rod has an outer sleeve and an inner core, the core and the sleeve being one of rotatable and shiftable with respect to one another,
   j. wherein an adjusting lever is connected to the piston rod core for displacing the piston rod core against the piston rod sleeve.

2. A damper according to claim 1, wherein the through-flow channel is at least partially arranged in the piston rod (12; 12a).

3. A damper according to claim 1, wherein the adjusting element is arranged at least partially in the piston rod.

4. A damper according to claim 1, wherein the adjusting element is arranged completely in the piston rod.

5. A damper according to claim 1, wherein the through-flow channel is closable to interrupt the through-flow connection between the part working chambers by means of the adjusting element.

6. A damper according to claim 1, wherein the adjusting element is actuatable by means of displacement with respect to the centre longitudinal axis.

7. A damper according to claim 1, wherein the adjusting element is actuatable by means of at least one of rotation and shifting with respect to the centre longitudinal axis.

8. A damper according to claim 1, wherein a valve is arranged in at least one of the first compensating channel and the second compensating channel.

9. A damper according to claim 1, wherein an automatic valve, is arranged in at least one of the first compensating channel and the second compensating channel.

10. A damper according to claim 1, wherein the first closing element comprises an annular gap valve.

11. A damper comprising
   a. a housing, which
      i. encloses a working chamber and a compensating chamber and
      ii. has a centre longitudinal axis,
   b. a damping fluid located at least partially in the working chamber,
   c. a guide and sealing unit, which terminates the housing at a first housing end,
   d. a piston device comprising
      i. a piston rod, which, sealed by the guide and sealing unit, is guided out of the housing, and
      ii. a piston fastened to the piston rod and guided in the housing along the centre longitudinal axis, wherein
   e. the piston divides the working chamber into a first part working chamber with a first working chamber end and a second part working chamber with a second working chamber end,
   f. arranged at the first working chamber end is a first closing element, with a first compensating channel, which forms a through-flow connection between the first part working chamber and the compensating chamber,
   g. arranged at the second working chamber end is a second closing element, with a second compensating channel,
   i. which forms a through-flow connection between the second part working chamber and the compensating chamber, and
   h. the piston device has a through-flow channel,
      i. said through-flow channel forming a bi-directional through-flow fluidly connecting the first and second part working chambers, and
      ii. the said through-flow channel having an effective flow cross section which is adjustable by means of an adjusting element,
   i. wherein the first closing element comprises an annular gap valve,
   j. the annular gap valve has a valve ring, the valve ring being arranged on the piston rod with frictional engagement and shiftably,
   k. wherein the annular gap valve is arranged along a fluid direction between the first part working chamber and the compensating chamber, wherein the annular gap valve closes or opens fluid flow from the first part working chamber into the compensating chamber.

12. A damper according to claim 11, wherein the annular gap valve has a valve ring, the valve ring being arranged on the piston rod in a sealed manner.

13. A damper according to claim 11, wherein the annular gap valve is actuatable by shifting the piston rod in the direction of the centre longitudinal axis.

14. A damper according to claim 8, wherein two valves are provided, and each of the valves are arranged in one of the first and in the second compensating channel, the valves being configured in such a way that upon a movement of the piston in the direction of the centre longitudinal axis, one of the valves opens in each case, while the other one closes in each case.

15. A damper according to claim 1, wherein provided in through-flow connection is an overload protection element, which, when a predetermined limit force is exceeded in the direction of the centre longitudinal axis on the piston rod, ensures that this through-flow connection is open.

16. A damper according to claim 1, wherein the piston rod has an outer sleeve and an inner core, the core and the sleeve being displaceable with respect to one another.

17. A damper according to claim 1, wherein the piston rod core is rotated against the piston rod sleeve.

18. A damper comprising
   a. a housing, which
      i. encloses a working chamber and a compensating chamber and
      ii. has a centre longitudinal axis,
   b. a damping fluid located at least partially in the working chamber,
   c. a guide and sealing unit, which terminates the housing at a first housing end,
   d. a piston device comprising
      i. a piston rod, which, sealed by the guide and sealing unit, is guided out of the housing, and
      ii. a piston fastened to the piston rod and guided in the housing along the centre longitudinal axis,
   wherein
   e. the piston divides the working chamber into a first part working chamber with a first working chamber end and a second part working chamber with a second working chamber end,
   f. arranged at the first working chamber end is a first closing element, with a first compensating channel, which forms a through-flow connection between the first part working chamber and the compensating chamber,
   g. arranged at the second working chamber end is a second closing element, with a second compensating channel, which forms a through-flow connection between the second part working chamber and the compensating chamber, and
   h. the piston device has a through-flow channel,
      i. said through-flow channel forming a bi-directional through-flow fluidly connecting the first and second part working chambers, and
      ii. said through-flow channel having an effective flow cross section which is adjustable by means of an adjusting element,
   i. wherein the piston rod has an outer sleeve and an inner core, the core and the sleeve being one of rotatable and shiftable with respect to one another,
   j. wherein the piston rod core comprises an end region with a recess.

19. A damper according to claim 18, wherein the recess is a segment of a circle-shape in the direction perpendicular to the center longitudinal axis.

20. A damper according to claim 18, wherein the recess has a center point angle, wherein the center point angle is at least 15°.

21. A damper according to claim 20, wherein the center point angle is at least 90°.

22. A damper according to claim 20, wherein an upper limit for the center point angle is at most 180°.

23. A damper according to claim 18, wherein the recess is a bore in the piston rod core.

24. A damper according to claim 18, wherein the recess is part of a through-flow channel which forms a through-flow connection between the part working chambers.

25. A damper according to claim 24, wherein the through-flow channel comprises a plurality of bores in the piston rod sleeve.

26. A damper according to claim 11, wherein the annular gap valve is a one-way valve.

27. A damper comprising
   a. a housing, which
      i. encloses a working chamber and a compensating chamber and
      ii. has a centre longitudinal axis,
   b. a damping fluid located at least partially in the working chamber,
   c. a guide and sealing unit, which terminates the housing at a first housing end,
   d. a piston device comprising
      i. a piston rod, which, sealed by the guide and sealing unit, is guided out of the housing, and
      ii. a piston fastened to the piston rod and guided in the housing along the centre longitudinal axis,
   wherein
   e. the piston divides the working chamber into a first part working chamber with a first working chamber end and a second part working chamber with a second working chamber end,
   f. arranged at the first working chamber end is a first closing element, with a first compensating channel, which forms a through-flow connection between the first part working chamber and the compensating chamber,
   g. arranged at the second working chamber end is a second closing element, with a second compensating channel, which forms a through-flow connection between the second part working chamber and the compensating chamber, and
   h. the piston device has a through-flow channel,
      i. said through-flow channel forms a bi-directional through-flow fluidly connecting the first and second part working chambers, and
      ii. said through-flow channel has an effective flow cross section which is adjustable by means of an adjusting element,
   i. wherein said first compensating channel comprises
      i. a first annular gap being configured between said piston rod and a valve body, said valve body being arranged in a sealed manner in said first part working chamber,
      ii. a second annular gap being formed between said valve body and a valve ring, said valve ring being displaceably arranged on said piston rod and
      iii. at least one through-opening being arranged in the direction of the center longitudinal axis and being provided in a stop element, said stop element being inserted into said valve body and said stop element limiting the displaceability of said valve ring on said piston rod.

\* \* \* \* \*